F. CONRAD.
ELECTRICAL REGULATOR.
APPLICATION FILED FEB. 3, 1910.

1,146,925.

Patented July 20, 1915.
2 SHEETS—SHEET 1.

WITNESSES:
C. L. Belcher
Otto S. Schairer.

INVENTOR
Frank Conrad
BY
Wiley G. Carr
ATTORNEY

F. CONRAD.
ELECTRICAL REGULATOR.
APPLICATION FILED FEB. 3, 1910.

1,146,925.

Patented July 20, 1915.
2 SHEETS—SHEET 2.

WITNESSES:
C. L. Belcher
Otto S. Schairer

INVENTOR
Frank Conrad
BY
Wesley G. Carr
ATTORNEY

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

ELECTRICAL REGULATOR.

1,146,925.  Specification of Letters Patent.  Patented July 20, 1915.

Application filed February 3, 1910. Serial No. 541,785.

*To all whom it may concern:*

Be it known that I, FRANK CONRAD, a citizen of the United States, and a resident of Swissvale, in the county of Allegheny and State of Pennsylvania, have invented a new and useful Improvement in Electrical Regulators, of which the following is a specification.

My invention relates to devices for regulating the voltage delivered to an electrical circuit by a generator or for regulating the operation of a booster that is employed in connection with a secondary battery.

The object of my invention is to provide a regulator of the character indicated that shall be effective and reliable in operation and simple and economical in construction.

Figure 1:
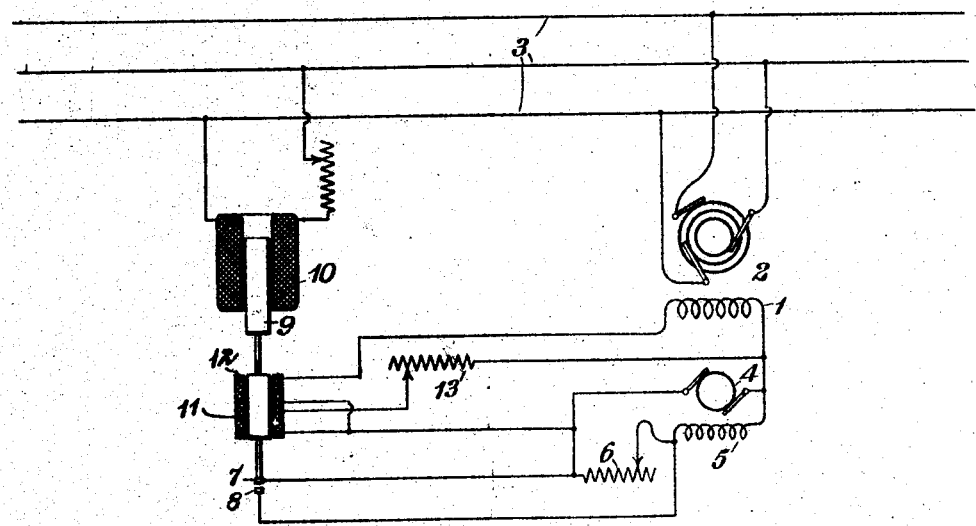
Figure 2:
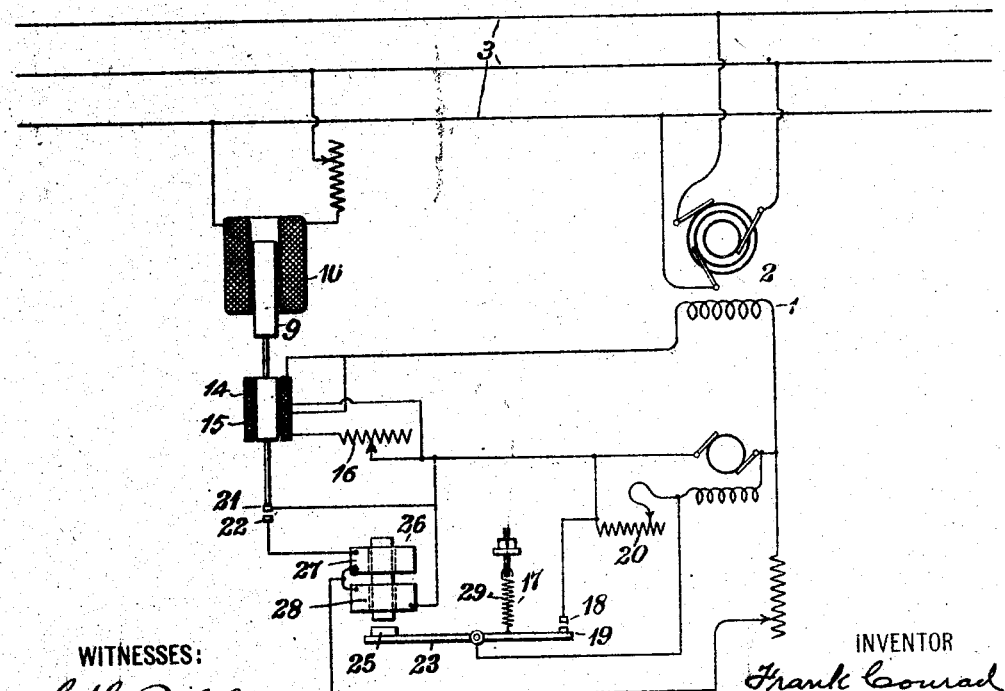
Figure 3:
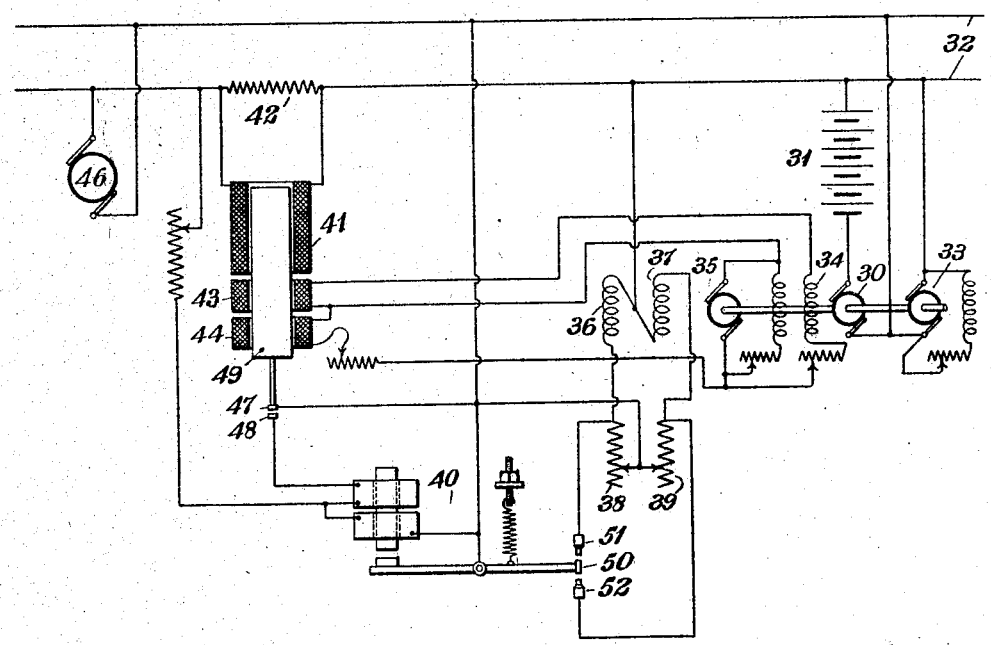

The invention is illustrated in the accompanying drawings, Figure 1 of which is a diagrammatic view of a system in which the invention is embodied in a voltage regulator. Fig. 2 illustrates a modification of the regulator of Fig. 1, and Fig. 3 is a diagrammatic view of a system in which the invention is embodied in a regulator for a booster that is employed in connection with a battery.

In Fig. 1, field magnet winding 1, of an alternating current generator 2 that is connected to a distributing circuit 3 is supplied with exciting current from an exciter 4 in series with field magnet winding 5 of which is a resistance 6. A shunt circuit to the resistance 6 is governed by means of a pair of coöperating contact terminals 7 and 8, the former of which is carried by the armature 9 of an electro-magnetically operated device that is provided with three windings 10, 11 and 12. The main winding 10 is connected across the circuit 3 and accordingly exerts an attractive force upon the armature 9 which tends to raise the same and is proportional to the voltage of the said circuit. The winding 11 is connected in series with the exciter armature and the field magnet winding of the generator 2, and the winding 12 is connected between the terminals of the armature of the exciter, a resistance 13 being preferably connected in series therewith for the purpose of causing the current therein to agree in phase, approximately, with the voltage applied to the winding. The windings 11 and 12 are differential windings, the winding 11 opposing the main winding 10 and the winding 12 assisting or supplementing the same.

At normal voltage of the circuit 3, the winding 10 is energized to such a degree that it just permits the contact terminal 7 to engage the terminal 8. Under this condition, the resistance 6 is short-circuited and the field of the exciter is strengthened. This results in an increase in voltage of the exciter and a strengthening of the field of the generator. By reason of the strengthening of the generator field, the voltages of the generator and of the circuit 3 are increased and the winding 10 becomes energized to a sufficient degree to effect separation of the terminals 7 and 8. Since the current in the field magnet winding of the generator lags considerably behind the electromotive force applied to it, the voltage of the generator will lag considerably behind the electromotive force of the exciter, with the result that, under ordinary conditions, the terminals 7 and 8 will not be separated until sometime after the voltage of the exciter has attained a sufficient value for ultimately effecting the desired strengthening of the field of the generator. In order to effect the separation of the terminals 7 and 8, sooner than can be effected by the winding 10 alone, the differential windings 11 and 12 are also provided to act upon the armature 9. As the winding 12 is connected between the terminals of the exciter armature, and the ohmic resistance of its circuit is high, as compared with its inductive resistance the current traversing it will be nearly, or approximately, in phase with the electromotive force of the exciter armature. The winding 12 exerts a force, therefore, upon the armature 9 which is supplementary to that exerted by the winding 10 and assists in effecting the separation of the terminals 7 and 8, so that such separation will occur sooner than it would if the winding 10 were relied upon alone for effecting the separation.

As the winding 11 is in series with the field of the generator, the current traversing it will not rise to its full value until sometime after the current traversing the winding 12 has attained its full value. However, when the current traversing the winding 11 has attained its full value, the magnetizing effects of the windings 11 and 12 neutralize each other, and the armature 9 is then acted upon by the winding 10 alone.

Upon separation of the terminals 7 and 8, the resistance 6 is included in the circuit of the exciter field winding 5 with the result that the field strength and the voltage of the exciter are diminished, as well as the field strength and voltage of the generator. The lowering of the generator voltage effects a reduction of the attraction exerted by the winding 10 upon the armature 9, and the terminal 7 is again lowered into engagement with the terminal 8. The reëngagement of the terminals 7 and 8 is hastened by reason of the lowering of the voltage of the exciter, and a consequent temporary reduction of the magnetizing force of the winding 12 to a value less than that of the winding 11, which latter winding exerts a downward pull upon the armature 9. The terminals 7 and 8 will, in this manner, be caused to engage and disengage for approximately equal periods of time when the voltage of the circuit 3 is approximately normal.

If the load upon the circuit 3 is such as to tend to reduce the voltage of the circuit, the winding 10 will be energized to a slightly lessened degree, the result being that the periods of engagement of the terminals 7 and 8 are slightly longer than the periods of disengagement, and that the resistance 6 is shunted for slightly greater periods than it is included in the circuit of the exciter field winding 5. This will cause increased field strength and voltage of both the exciter and the generator, so that the generator will maintain the voltage of the circuit 3 substantially normal. If, on the other hand, the load upon the circuit 3 is light and there is a tendency for the voltage to exceed its normal value, the winding 10 will cause the periods of disengagement of the terminals 7 and 8 to be longer than the periods of engagement, with the result that the field strength and voltage of both the exciter and generator will be lowered accordingly.

Instead of connecting one of the auxiliary windings of the regulating device between the terminals of the exciting armature and the other in series therewith and with the field of the generator, both windings 14 and 15 may be connected in series with the exciter armature and generator field winding as shown in Fig. 2. A resistance 16 is connected in series with one of the windings 15 for the purpose of causing the current traversing the winding 15 to be leading in phase with respect to the current traversing the winding 14. With such arrangement, the operation of the regulator will be substantially the same as described in connection with Fig. 1, except, of course, that the current traversing the winding 15 will not be as near in phase with the exciter electromotive force as the current traversing the winding 12 of Fig. 1. In Fig. 2 also, an auxiliary relay 17 having stationary and movable contact terminals 18 and 19 is interposed between the resistance 20 in the exciter field circuit and the terminal members 21 and 22 for the purpose of governing the shunt to the said resistance and of relieving the terminals 21 and 22 of the arcing that might otherwise occur between them. The relay 17 comprises a lever 23 that carries the terminal 19 at one end and an armature 25 at its other end, and a magnet 26 having differential windings 27 and 28, one of which is connected permanently between the terminals of the exciter armature and the circuit of the other of which is governed by the contact terminals 21 and 22. When the terminals 21 and 22 engage each other, the windings 27 and 28 neutralize each other and the terminal 19 is caused to engage the terminal 18 by means of a spring 29, and when the terminals 21 and 22 are not in engagement, the magnet 26 is magnetized by the windings 28 and accordingly attracts the armature 25, thereby effecting separation of the terminals 18 and 19. The operation of the remainder of the system will be understood from the description of the operation of the system of Fig. 1.

In Fig. 3, the regulator is employed for governing the direction and value of the voltage of a booster 30 and the charging and discharging of the battery 31, the booster and battery being connected, in series, to a distributing circuit 32. The booster 30 is driven by a motor 33, or it may be driven by any other suitable means. Current is supplied to the booster field magnet winding 34 by means of an exciter 35 having two equal and opposing field magnet windings 36 and 37, that are supplied from the circuit 32, and in series with which are resistances 38 and 39. The exciter may also be driven by the motor 33. The relay 40 is employed for shunting the one or the other of the resistances 38 and 39, this relay being similar in construction and in operation to the relay 17 of Fig. 2. The regulating device is also similar to that of Figs. 1 and 2 and comprises a main operating winding 41 that is supplied with current which is proportional to that traversing the circuit 32, and, to that end, is connected in shunt to a resistance 42 that is included in the said circuit. The regulating device is also provided with auxiliary windings 43 and 44 that are respectively connected between the terminals of the exciter armature and in series therewith and with the field winding 34 of the booster 30.

If the load upon the circuit 32 is such that it can be carried entirely by the generator 46, and the battery 31 neither charges nor discharges, the contact terminals 47 and 48 will be caused to engage and disengage for equal periods of time by the action of the coils 41, 43 and 44 upon the armature 49 that carries the terminal 47. A vibratory movement of the armature and lever of the relay 40 is thus effected, and contact terminal 50 that is carried thereby is caused to engage, for equal periods of time, with contact terminals 51 and 52. The resistances 38 and 39 are thus short circuited for equal periods of time and the windings 36 and 37 are accordingly fully energized for equal periods of time. The field strength and the voltage of the exciter therefore fluctuate somewhat and the field strength and voltage of the booster 30 follow the said fluctuations but are of less amplitude, on account of the inductance of the booster field. The action of the regulator in effecting this result is substantially as described in connection with the system of Fig. 1.

If the load upon the circuit 32 is such that current is required from the battery 31 to supplement that supplied by the generator 46, the contact terminals 47 and 48 will be caused, by the windings 41, 43, and 44, to remain out of engagement for longer periods than they remain in engagement, and the contact terminal 50 will, therefore, engage the terminal 52. The magnetizing effect of the field magnet winding 37 will then predominate over that of the winding 36. The exciter and booster electromotive forces are then such that the booster electromotive force will supplement that of the battery and cause the battery to discharge current to the circuit 32. The value of the booster electromotive forces will also be such that when added to the voltages of the battery, the same will just equal the desired or normal voltage of the circuit 32.

If the load upon the circuit 32 is such that no current is required from the battery 31, and is less than that which can be supplied by the generator 46, the contact terminals 47 and 48 will remain in engagement for longer periods of time than they remain out of engagement, and the contact member 50 will engage the terminal 51 for longer periods of time than it engages the terminal 52. The winding 36 thus predominates in its magnetizing effect over the winding 37, and the exciter and booster electromotive forces are such that the battery is caused to take current from the circuit 32. The action of the regulator is thus such that charging and discharging of the battery is effected automatically in accordance with the load upon the circuit 32.

Although in the system of Fig. 3 the currents in the coils 43 and 44 reverse in direction when the exciter voltage reverses, the resultant magnetizing effect of the said coils will be the same in relation to the effect of the coil 41 after reversal as before. This will be readily understood by considering, for instance, that when the currents in the coils 43 and 44 diminish, the current in the coil 43 follows that in the coil 44. Consequently, at any instant during the time that the currents are decreasing, the current in the coil 43 is greater than that in the coil 44, and the effect of the coil 43 upon the core preponderates over that of the coil 44. If the currents reverse in the said coils, that in the coil 43 still follows that in the coil 44, but the effect of the coil 44 upon the core now preponderates over that of the coil 43, because the currents in the coils then increase in value. However, on account of the reversal of the currents this preponderance or difference is still in the same direction or relation with respect to the main coil 41 as it was previous to the reversal of currents.

While the invention has been described as applied to certain specific systems, it will be understood that it is not limited, in its application, to such systems, but may be employed without departing from the spirit of the invention wherever its principles may be utilized to advantage.

I claim as my invention:

1. The combination with a distributing circuit, a generator connected thereto, and an exciter for the generator, of a regulator comprising means continuously responsive to electrical variations in the distributing circuit and to the phase difference of the exciter voltage and the exciting current for the generator.

2. The combination with a distributing circuit, a generator connected thereto, and an exciter for the generator, of a regulator comprising means responsive to electrical variations in the distributing circuit and to the phase difference of two circuits that are continuously derived from the exciter circuit.

3. The combination with a distributing circuit, a generator connected thereto having a field winding, and an exciter for the generator, of a regulator comprising a winding that is connected to the distributing circuit and differential windings that are connected respectively in shunt to and in series with the generator field winding.

4. The combination with a distributing circuit, a generator connected thereto, and an exciter for the generator, of a regulator comprising a winding that is connected to the distributing circuit and other windings that are connected respectively in series with, and between the terminals of the exciter and are arranged to act in opposition to each other.

5. The combination with a distributing circuit, a generator connected thereto having a field winding, and an exciter for the generator, of a regulator comprising a main winding that is connected to the distributing circuit and auxiliary windings that are connected respectively in series with and in shunt to the generator field winding, the shunt winding supplementing and the series winding opposing the main winding.

6. The combination with a distributing circuit, a generator connected thereto, and an exciter for the generator, of a regulator comprising a main winding that is connected to the distributing circuit, auxiliary windings that are connected to the exciter circuit and are arranged to act in opposition to each other, and means for displacing the phase of the current in one of the auxiliary windings with respect to the current in the other auxiliary winding.

7. The combination with a distributing circuit, a generator connected thereto, and an exciter for the generator, of a regulator comprising a main winding that is connected to the distributing circuit, auxiliary windings that are connected to the exciter circuit, and means for displacing the phase of the current in one auxiliary winding with respect to that in the other auxiliary winding, the winding in which the leading current flows being supplementary to the main winding and the winding in which the lagging current flows being opposed to the main winding.

8. The combination with a distributing circuit, a generator connected thereto, and an exciter for the generator, of a regulator comprising a contact-carrying member, a main winding and two continuously energized auxiliary actuating windings therefor, the circuits of which are independent of the contact-carrying member, the auxiliary windings receiving current from the exciter and being arranged to act in opposition to each other.

9. The combination with a distributing circuit, a generator connected thereto having a field winding, and an exciter for the generator, of a regulator comprising a winding that is connected to the distributing circuit, and other windings that are continuously connected respectively in series with and in shunt to the generator field winding.

10. The combination with a distributing circuit, a generator connected thereto having a field winding, and an exciter for the generator, of a regulator comprising a winding that is connected to the distributing circuit and other windings that are continuously connected respectively in series with and in shunt to the generator field winding, and a resistance in series with the shunt winding.

11. The combination with a distributing circuit, a generator connected thereto, and an exciter for the generator, of a regulator comprising a main winding that is connected to the distributing circuit, auxiliary differential windings that are connected in series with the exciter and the field winding of the generator, and means for displacing the phases of the currents in the auxiliary windings with respect to each other.

12. The combination with a distributing circuit, a generator connected thereto, and an exciter for the generator, of a regulator comprising coöperating contact members, actuating means therefor responsive to electrical variations in the distributing circuit, and continuously energized differential windings that are supplied from the exciter circuit, and the circuits of which are independent of the contact members.

13. The combination with a generator, and an exciter therefor, of a vibratory member for regulating the resistance of the field circuit of the exciter, a main actuating coil for the said member that is excited by current derived from the generator, and auxiliary differential continously energized actuating coils for the vibratory member that are excited by current derived from the exciter, and the circuits of which are independent of the vibratory member.

In testimony whereof, I have hereunto subscribed my name this 27th day of Jan., 1910.

FRANK CONRAD.

Witnesses:
OTTO S. SCHAIRER,
B. B. HINES.